United States Patent
Dockter et al.

(10) Patent No.: US 6,292,798 B1
(45) Date of Patent: Sep. 18, 2001

(54) METHOD AND SYSTEM FOR CONTROLLING ACCESS TO DATA RESOURCES AND PROTECTING COMPUTING SYSTEM RESOURCES FROM UNAUTHORIZED ACCESS

(75) Inventors: Michael Jon Dockter, Ft. Myers, FL (US); Joel Frank Farber, San Jose, CA (US); Ronald William Lynn, Gilroy, CA (US); Randal James Richardt, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/150,395

(22) Filed: Sep. 9, 1998

(51) Int. Cl.[7] .................................................... G06F 17/30
(52) U.S. Cl. .............................. 707/9; 707/10; 707/103; 709/201; 709/205; 709/217; 709/225; 709/229; 713/200
(58) Field of Search ........................ 713/200; 707/9, 707/10, 103; 709/201, 205, 217, 225, 229

(56) References Cited

U.S. PATENT DOCUMENTS

| | | | |
|---|---|---|---|
| 4,956,769 | 9/1990 | Smith | 364/200 |
| 5,265,221 * | 11/1993 | Miller | 711/163 |
| 5,276,901 * | 1/1994 | Howell et al. | 707/9 |
| 5,335,346 | 8/1994 | Fabbio | 395/600 |
| 5,446,903 | 8/1995 | Abraham et al. | 39/600 |
| 5,450,593 | 9/1995 | Howell et al. | 395/650 |
| 5,504,814 | 4/1996 | Miyahara | 380/4 |
| 5,539,906 | 7/1996 | Abraham et al. | 395/600 |
| 5,572,673 | 11/1996 | Shurtz | 395/186 |
| 5,613,099 | 3/1997 | Erickson et al. | 395/500 |
| 5,627,967 * | 5/1997 | Dauerer et al. | 713/202 |
| 5,727,145 | 3/1998 | Nesett et al. | 395/186 |
| 5,742,759 | 4/1998 | Nesett et al. | 395/187.01 |
| 5,941,947 * | 8/1999 | Brown et al. | 709/225 |
| 6,029,246 * | 2/2000 | Bahr | 713/200 |
| 6,052,688 * | 4/2000 | Thorsen | 707/100 |
| 6,064,656 * | 5/2000 | Angal et al. | 370/254 |

FOREIGN PATENT DOCUMENTS

| | | | |
|---|---|---|---|
| 7-271693 | 10/1995 | (JP) | G06F/17/30 |
| WO95/14266 | 10/1994 | (WO) | G06F/17/30 |

OTHER PUBLICATIONS

IBM Technical Disclosure Bulletin, vol. 40, No. 05, May 1997, pp. 115–116, "Tagging Objects to Form an Arbitrary Group".

* cited by examiner

*Primary Examiner*—Hosain T. Alam
*Assistant Examiner*—Jean M. Corrielus
(74) *Attorney, Agent, or Firm*—Ohlandt, Greeley, Ruggiero & Perle, LLP; Ingrid M. Foerster, Esq.

(57) ABSTRACT

The invention controls access to data resources by performing the steps of: providing (i) a first directory which relates data objects to object groups, each object group including all data objects having a common assigned security attribute; (ii) a second directory which relates functions to function groups, each function group including functions having a common execution attribute; (iii) a third directory which relates users to user groups, each user group including users having a common user attribute; and a permission directory which lists allowed combinations of (user group, function group, object group). In response to a request from a user to perform a function with respect to an object, the permission directory is examined to determine if the access request is to be allowed or not allowed.

12 Claims, 2 Drawing Sheets

METHOD AND SYSTEM FOR CONTROLLING ACCESS TO DATA RESOURCES AND PROTECTING COMPUTING SYSTEM RESOURCES FROM UNAUTHORIZED ACCESS

FIELD OF THE INVENTION

This invention relates to security systems for protecting computer system resources from unauthorized access and, more particularly, to a method and apparatus for reducing the amount of required memory to implement the security system.

BACKGROUND OF THE INVENTION

Many methods of computing system security exist. Examples include: access control lists, public/group/private access, User ID, password, etc. Basically all such security methods answer the same question: "May this Function happen, yes or no?"

The problem with many of the security systems is that their memory requirements increase at an exponential rate, dependent upon the number of securable objects which can be accessed by a number of users to carry out a variety of functions. In this regard, a User is identified by an identifier, an Object by a name and a Function by a brief descriptor of its operation. For example a Function may be a read, a write or a delete function (or any combination thereof) with respect to a database entry. Further, the function may evidence a constraint, e.g. access allowed only during set business hours; access allowed at all hours; etc.

In the prior art some systems have required that all permutations of (Objects, Users, Functions) be maintained. In such a case when User-Y wants to perform Function-Z with respect to Object-X, the security check examines the security state for (Object-X, User-Y, Function-Z).

The problem with this solution is that X*Y*Z security states need to be maintained (where X=number of Objects, Y=number of Users, and Z=number of Functions). The storage required is of the order of $N^3$ for a large value of N.

Different security systems may require more than Object, User, and Function. Examples might be when the Object is acted upon or the location of the User attempting the access the Object. For systems of this type, the storage costs grow at the rate of $N^4$, $N^5$, or more. In such cases, the value of N has a more profound effect. Hereafter, the discussion will focus on $N^3$ storage costs.

The prior art includes a variety of teachings regarding security systems for protecting data. For instance, U.S. Pat. No. 5,539,906 to Abraham et al. (assigned to the same Assignee as this application) describes a security system which protects data pertaining to an industrial process (or a series of industrial process steps). Abraham et al. enable access to data that derives from a process step which is currently active, but only to a select group. Thus, access to the process data is prevented, based on the status of the data, in addition to the category or type of data. For instance, users may have access to data elements at some steps in the process, but are denied access to those data elements at other steps in the process. Abraham et al. further suggest that their method for controlling security based on the data status and location may be used with password control, security level control and other classifications based on groups of users or type of data.

U.S. Pat. No. 5,504,814 to Miyahara describes a computer security mechanism that includes an access control table that specifies predetermined access rights of each of a plurality of predetermined security subjects relative to predetermined security objects. The access control table further includes a collection of mutually exclusive execution domains for each of the security subjects so that the executing processes of the security subject can only directly access code and data contained within the collection of domains of such security subject.

Howell et al. in U.S. Pat. No. 5,450,590, assigned to the same assignee as this Application, describe a security system wherein data access is controlled in accord with a time-based schedule.

Fabbio et al. in U.S. Pat. No. 5,335,346, assigned to the same Assignee as this Application, describe a security system wherein entries in an access control list include permissions for read write and execute. Those entries can be assigned to each of a number of identifiers that represent users or groups of users. Upon receiving a list of user IDs and group IDs, the access control routine performs a logical AND operation across the set of credentials represented by the different IDs and returns the least amount of privilege.

Notwithstanding the many and varied teachings in the prior art regarding security systems, there is still a need for a security system which evidences reduced memory requirements, even in the event of multiple security inter-relationships.

SUMMARY OF THE INVENTION

The invention controls access to data resources by performing the steps of: providing (i) a first directory which relates data objects to object groups, each object group including all data objects having a common assigned security attribute; (ii) a second directory which relates functions to function groups, each function group including functions having a common execution attribute; (iii) a third directory which relates users to user groups, each user group including users having a common user attribute; and a permission directory which lists allowed combinations of (user group, function group, object group). In response to a request from a user to perform a function with respect to an object, the permission directory is examined to determine if the access request is to be allowed or not allowed

DETAILED DESCRIPTION OF THE PREFERRED EMBODIMENT

Figure 1:
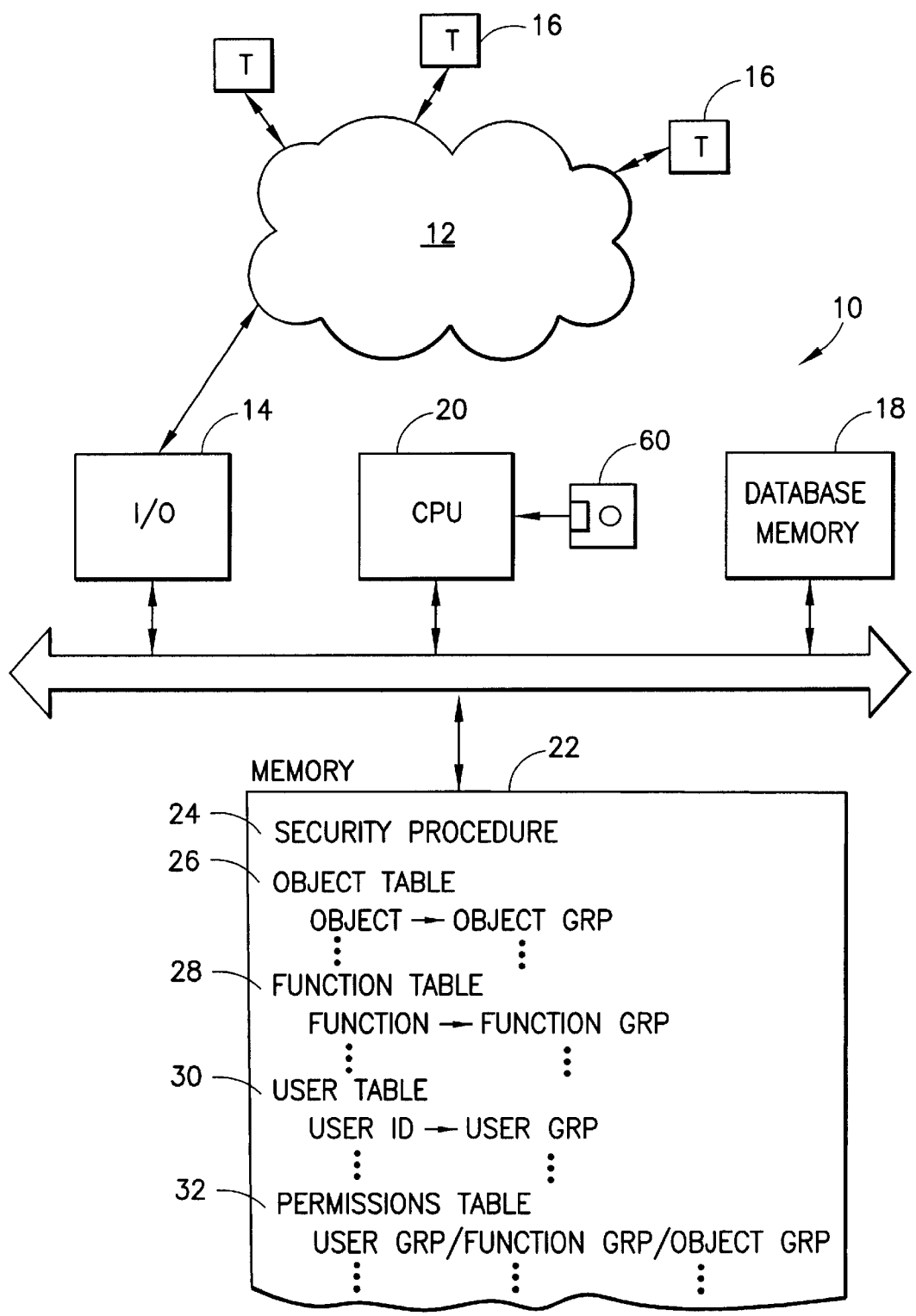
FIG. 1 is a high level system block diagram of apparatus adapted to perform the invention.

As indicated above with respect to the prior art, X*Y*Z security states need to be maintained when individual objects, users and functions are stored (where X=number of objects, Y=number of users, and Z=number of functions). The storage required is of the order of $N^3$ for a large value of N. The approach taken by this invention is to reduce the value of N.

First, it is noted that many users share common privileges, many objects share common securable information, and many functions share fundamental privileges. For instance: users may belong to the same company or same department within a company. They are often treated by the company as having the same status when it comes to viewing securable information. Objects may belong to a particular project where the project has been designated a certain level of security. Some functions may only allow information to be viewed, while other functions may allow a user to alter the information, etc . . .

Further, there is the tradeoff between storage costs and execution costs. The (objects, users, functions) data can be restructured so that it takes less storage, but may require more execution time to produce a desired result. Here, the security procedure is run sufficiently infrequently to justify the extra processing costs—especially in view of the substantial memory storage savings which result.

The differences between data structures and methods used prior to the invention will be contrasted with the data structures and methods used by the invention.

The prior art data structure looks like this:

TABLE 1

(Object, User, Function)

| OBJECTS | USERS | FUNCTION |
| --- | --- | --- |
| Object-1 | User-1 | Function-1 |
| Object-1 | User-1 | Function-2 |
| Object-1 | User-1 | Function-N |
| Object-1 | User-2 | Function-N |
| Object-1 | User-N | Function-N |
| Object-2 | User-1 | Function-1 |
| Object-2 | User-1 | Function-2 |
| Object-2 | User-1 | Function-N |
| Object-2 | User-2 | Function-N |
| Object-2 | User-N | Function-N |
| Object-N | User-1 | Function-1 |
| Object-N | User-1 | Function-2 |
| Object-N | User-1 | Function-N |
| Object-N | User-2 | Function-N |
| Object-N | User-N | Function-N |

In Table 1, each (Object, User, Function) is enumerated, associated and evidences an allowed combination if found in the table. Notice how much storage is required to keep this information.

The method of determining the security state is to look for the appropriate (Object, User, Function) in the Table and, if the required combination of (Object, User, Function) is found, it connotes an allowed combination.

With the invention, the data structure is as shown in Tables 2–4:

TABLE 2

(Object, Object Group)

| Object | Object Group |
| --- | --- |
| Object-1 | Object Group-1 |
| Object-2 | Object Group-1 |
| . | . |
| . | . |
| . | . |
| Object-N | Object Group-1 |

TABLE 3

(User, User Group)

| User | User Group |
| --- | --- |
| User-1 | User Group-1 |
| User-2 | User Group-2 |

TABLE 3-continued (User, User Group)

| User | User Group |
| --- | --- |
| . | . |
| . | . |
| . | . |
| User-N | User Group-2 |

TABLE 4

(Function, Function Group)

| Function | Function Group |
| --- | --- |
| Function-1 | Function Group-2 |
| Function-2 | Function Group-2 |
| . | . |
| . | . |
| . | . |
| Function-N | Function Group-1 |

Tables 2–4, as can be seen from above, organize: Objects into Object Groups; Users into User Groups; and Functions into Function Groups.

TABLE 5

Permission Table (Object Group, User Group, Function Group)

| Object Group | User Group | Function Group |
| --- | --- | --- |
| Object Group-1 | User Group-1 | Function Group-1 |
| Object Group-1 | User Group-1 | Function Group-2 |
| Object Group-1 | User Group-2 | Function Group-2 |

Permission Table 5 associates (Object Groups, User Groups, and Function Groups) into allowed groupings. More particularly, if a grouping is listed in the Permission table, it is an allowed grouping and if an inquiry matches an allowed grouping, the result is a dispatch of a permission to the user to perform a function with respect to the object in the object group. Note that much less storage is required for tables 2–5 than for Table 1.

Referring now to FIG. 1, a computing system 10 is shown that is adapted to carry out the invention. Computing system 10 is coupled to a network 12 via an input/output (I/O) module 14. Each of a plurality of terminals 16 is enabled to access, via network 12 and I/O module 14, data that is stored within a database memory 18 in computing system 10. A central processing unit (CPU) 20 controls overall operations of computing system 10 and operates in conjunction with programs and data stored in memory 22.

Memory 22 includes a security procedure that allows access to data in database memory 18 only upon condition that the data included in a user inquiry matches data in the permissions table shown above in Table 5. Accordingly, memory 22 includes an Object Table 26 which maps object identifiers to object groups; a Function Table 28 which maps functions to function groups; and a User Table 30 which maps user identifiers to user groups. Memory 22 further includes a Permissions Table 32 that is set up in accordance with the showing in Table 5 above.

With respect to Object Table 26, data objects (for example: belonging to a same project; belonging to a predetermined category of data, e.g. salary data; belonging to individuals; etc.) are arranged into object groups which contain all data objects having a common association attribute. Accordingly, there is an object group for all data from the same project; an object group for salary data, etc.

Regarding User Table 30, users having a same status, department, salary range, or other common category are grouped into individual user groups that are associated with the particular categorization. As regards Function Table 28, functions such as "allowed to write/delete data; allowed to read only data; allowed to read data only at certain times; allowed to read data at all times; excluded from access to all data; etc., etc." define various function groups.

Figure 2:
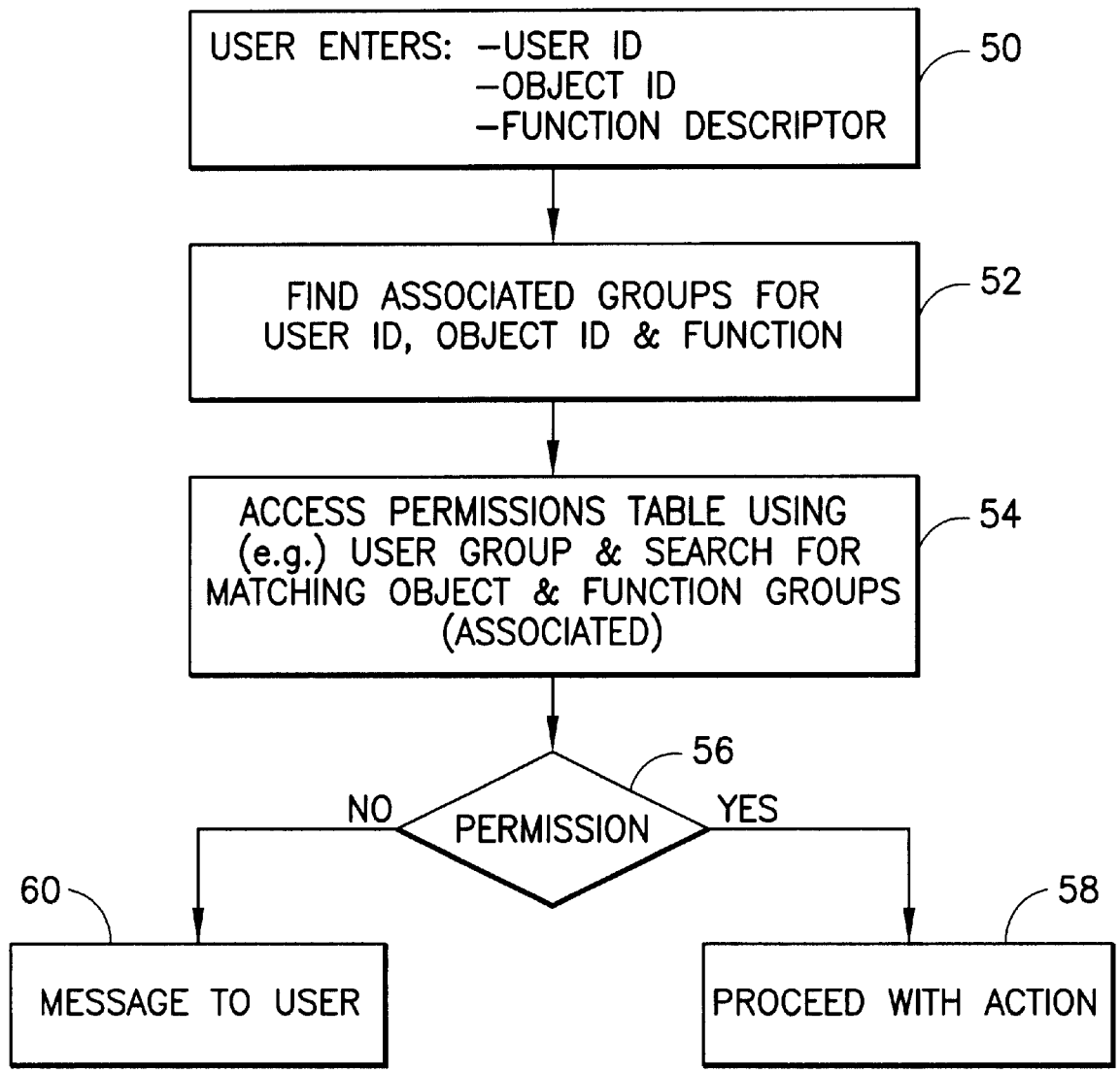
FIG. 2 is a logic flow diagram of the steps of the invention.

By arranging the users, objects and functions into groupings, the number N of combinations of user, object, function that are required to be stored in memory 22 are greatly reduced. Accordingly, as shown in FIG. 2, when a user enters a user identifier (ID), an object identifier and a function (e.g. read/write/delete) as shown in step 50, security procedure 24 receives the entered data and accesses each of Object Table 26, Function Table 28 and User Table 30. The entered user ID is identified as to the user group into which it has been assigned and the particular user group identifier is recorded. Similarly, both the function group and the object group into which the respectively entered function and object identifiers have been assigned are recorded (step 52).

Thereafter, Permissions Table 32 is searched using, for example, the user group identifier. If an entry in Permissions Table 32 is found corresponding to the user group identifier, the associated entries are examined. If the associated entries match the object group identifier and function group identifier associated with the user group identifier (used as the addressing mechanism), a permission signal is issued (steps 54 and 56). Upon issuance of the permission signal, the user is enabled to proceed with access to the object, etc. (step 58). If permission is denied, as a result of no matching entry being found in Permissions Table 32, a message is issued to the user indicating a denial of access(step 60).

In summary, the method of determining a security state is to:
1. Look for the appropriate Object, User, and Function in the corresponding "group" tables to see which ObjectGroup, UserGroup, and FunctionGroup they belong.
2. Look for the appropriate ObjectGroup, UserGroup, FunctionGroup in the Permissions Table to determine if they are listed as a tuple. If yes, permission is granted; if no, it is denied.

A principal advantage of the invention is the storage savings that are achieved by reducing the value of N (recall that stored data grows by an order of $N^3$). As a tradeoff, additional execution time is required for the method. However, this is a small, fixed cost. It is worth noting that as N grows larger, the execution costs of the invention outperform the prior art due to the massive amounts of data which need to be searched in the prior art.

It should be understood that the foregoing description is only illustrative of the invention. Various alternatives and modifications can be devised by those skilled in the art without departing from the invention. For example, while all of the control procedures used by the invention have been discussed as though they were already loaded into memory, such procedures may be stored on a storage media, such as the magnetic disk 60 shown in FIG. 1. Then, they may be loaded into memory as needed. Accordingly, the present invention is intended to embrace all such alternatives, modifications and variances which fall within the scope of the appended claims.

What is claimed is:

1. A method for controlling access to data resources, comprising the steps of:
    a) providing a first directory that relates data objects to object groups, each object group comprising data objects having a common assigned security attribute;
    b) providing a second directory that relates functions to function groups, each function group comprising functions having a common execution attribute;
    c) providing a third directory that relates users to user groups, each user group comprising users having a common user attribute;
    d) providing a permission directory that lists allowed combinations of (user group, function group, object group); and
    e) responding to an access request from a user to perform a function with respect to an object, by determining from said first, second and third directories, an object group, function group and user group that correspond to said object, function and user, respectively, and determining from said permission directory if said access request is to be allowed or not allowed.

2. The method as recited in claim 1, wherein said function groups segregate at least some database functions of read, write, add and delete into different function groups.

3. The method as recited in claim 1, wherein said function groups include one or more groups that comprise constraint functions that define times or conditions under which a function is allowed or not allowed.

4. The method as recited in claim 1, wherein said function groups, user groups and object groups have no predetermined relationship other than relationships indicated by entries in said permissions table.

5. A system for controlling access to data resources in a database, comprising:
    a) first directory means for relating data objects to object groups, each object group comprising data objects having a common assigned security attribute;
    b) second directory means for relating functions to function groups, each function group comprising functions having a common execution attribute;
    c) third directory means for relating users to user groups, each user group comprising users having a common user attribute;
    d) permission directory means for listing allowed combinations of (user group, function group, object group); and
    e) processor means for responding to an access request from a user to perform a function with respect to an object, by determining from said first, second and third directory means, an object group, function group and user group that correspond to said object, function and user, respectively, and determining from said permission directory means if said access request is to be allowed or not allowed.

6. The system as recited in claim 5, wherein said first directory means segregates at least some said function groups that define database functions of read, write, add and delete, into different function groups.

7. The system as recited in claim 5, wherein said function groups include one or more groups that comprise constraint functions that define times or conditions under which a function is allowed or not allowed.

8. The system as recited in claim 5, wherein said function groups, user groups and object groups have no predetermined relationship other than relationships indicated by entries in said permissions table means.

9. A memory media for operating a processor to control access to data resources, comprising:
  a) means for controlling said processor to provide a first directory that relates data objects to object groups, each object group comprising data objects having a common assigned security attribute;
  b) means for controlling said processor to provide a second directory that relates functions to function groups, each function group comprising functions having a common execution attribute;
  c) means for controlling said processor to provide a third directory that relates users to user groups, each user group comprising users having a common user attribute;
  d) means for controlling said processor to provide a permission directory that lists allowed combinations of (user group, function group, object group); and
  e) means for controlling said processor to respond to an access request from a user to perform a function with respect to an object, by determining from said first, second and third directories, an object group, function group and user group that correspond to said object, function and user, respectively, and determining from said permission directory if said access request is to be allowed or not allowed.

10. The memory media as recited in claim 9, wherein said means b) segregates at least some database functions of read, write, add and delete into different function groups.

11. The memory media as recited in claim 9, wherein said function groups include one or more groups that comprise constraint functions that define times or conditions under which a function is allowed or not allowed.

12. The memory media as recited in claim 9, wherein said means a), b) and c) create function groups, user groups and object groups that have no predetermined relationship other than relationships indicated by entries in said permissions table.

* * * * *

UNITED STATES PATENT AND TRADEMARK OFFICE
CERTIFICATE OF CORRECTION

PATENT NO. : 6,292,798 B1  Page 1 of 1
DATED : September 18, 2001
INVENTOR(S) : Michael Jon Dockter, Joel Frank Farber, Ronald William Lynn and Randal James Richardt It is certified that error appears in the above-identified patent and that said Letters Patent is hereby corrected as shown below:

<u>Title page,</u>
Delete "METHOD AND SYSTEM FOR CONTROLLING ACCESS TO DATA RESOURCES AND PROTTECTING COMPUTING SYSTEM RESOURCES FROM UNAUTHORIZED ACCESS"

and insert -- METHOD AND SYSTEM FOR CONTROLLING ACCESS TO DATA RESOURCES BY DETERMINING AN OBJECT GROUP, FUNCTION GROUP AND USER GROUP, AND DETERMINING FROM A PERMISSION DIRECTORY WHETHER AN ACCESS REQUEST IS TO BE ALLOWED --.

Signed and Sealed this

Twenty-sixth Day of February, 2002

*Attest:*

JAMES E. ROGAN
*Attesting Officer*   *Director of the United States Patent and Trademark Office*